Nov. 12, 1968 G. K. FARNEY 3,411,034

MICROWAVE AMPLIFIER TUBE HAVING CAPACITIVE LOADING MEANS FOR THE SLOW WAVE CIRCUIT

Filed June 11, 1965 2 Sheets-Sheet 1

*INVENTOR.*

GEORGE K. FARNEY

BY Harry E. Aine

ATTORNEY

*INVENTOR.*
GEORGE K. FARNEY
BY Harry E. Aine
ATTORNEY

United States Patent Office 3,411,034

Patented Nov. 12, 1968

3,411,034

MICROWAVE AMPLIFIER TUBE HAVING CAPACITIVE LOADING MEANS FOR THE SLOW WAVE CIRCUIT

George K. Farney, New Providence, N.J., assignor to S-F-D Laboratories, Inc., Union, N.J., a corporation of New Jersey Filed June 11, 1965, Ser. No. 463,221
7 Claims. (Cl. 315—39.3)

ABSTRACT OF THE DISCLOSURE

A capacitively shunt loaded coupled vane slow wave circuit and tubes using same are disclosed. The slow wave circuit includes a vane array having a conductive member overlaying the side edges of the vanes near the tips thereof for increasing the shunt capacity loading of the slow wave circuit to improve its electronic bandwidth. In a preferred embodiment, the capacitive loading structure comprises two conductive members disposed on opposite sides of the vanes near the tips thereof and running the length of the circuit. In another embodiment, a dielectric material is disposed between the loading members and the vanes for increasing the capacity of the loading structure. In another embodiment, the capacitive loading structure is conductively connected via the side walls of the tube structure to the roots of the vanes with the electrical length of the capacitive loading structure being substantially longer than the electrical length of the vanes. In another embodiment, the capacitive loading structure includes conductive tabs protruding into the spaces between adjacent vanes for increasing the capacitive loading of the capacitive loading structure. In another embodiment, the vanes are T-shaped with the cross arm portions of the "T" forming the capacitive portion of the vanes for substantially improving the electronic bandwidth of the circuit. In another embodiment of the slow wave circuit, the circuit is coupled to a transmission line via a transition section connected essentially to the center of an end vane such that the power flow is equally divided between the top and bottom halves of the capacitively loaded vane structure defined by the space between the side edges of the vanes and a pair of capacitive loading members disposed on opposite sides of the vanes.

Heretofore, the conventional unstrapped vane magnetron circuit has provided forward fundamental mode operation. This circuit is equivalent to a two wire line with one wire series inductively loaded with resonant elements, vanes, and the other wire formed by the ground plane cathode surface. Such a circuit is typically characterized by a relatively high phase shift per section over the range of permissably low operating voltages. Accordingly, the circuit has been most often used in the $\pi$ mode as an oscillator circuit. The circuit may be used as a forward traveling wave circuit by decreasing its shunt impedance, thus lowering the high frequency cut off and increasing the slope in the high phase shift per section region of the dispersion curve. In the typical vane circuit, this meant decreasing the anode to cathode spacing to increase the shunt capacitance. However, the optimum anode to cathode spacing is best chosen for other considerations such as best electronic interaction which is typically obtained when the anode to cathode spacing is about the same as the spacing between adjacent vane tips.

In the present invention the vane circuit is modified such that the cathode does not form the other wire of the two wire line. Instead, one or more other wires are employed as the second wire of the two wire line. However, as before, the electrons of the electron stream are interacted with the same series voltages developed across the series loading elements (vanes) of the one wire of the two wire line. The other wire, which has been added, may then be positioned and loaded as desired to alter the dispersion characteristics of the slow wave circuit to obtain increased operating bandwidth. The cathode to anode spacing may then be independently selected for optimum electronic interaction.

The principal object of the present invention is the provision of an improved vane type slow wave circuit and tubes using same.

One feature of the present invention is the provision of a conducting member spaced from but adjacent to and extending along the side edge of a vane array slow wave circuit to define a two wire slow wave circuit along at least one side edge of the array of vanes, whereby the dispersion characteristics of the slow wave circuit may be controlled by choice of parameters for the thus defined two wire circuit formed along the side edge of the array without interfering with the optimum spacing between the vane tips and an adjacent cathode member.

Another feature of the present invention is the same as the preceding feature wherein a second two wire line is similarly formed along the opposite side edge of the vane array for increased control over the dispersion characteristics of the vane array slow wave circuit.

Another feature of the present invention is the same as any one of the preceding features wherein the side edge two wire line is provided with increased shunt capacity loading either by means of a dielectric member disposed between the vane array and the adjacent conductive member or by means of an array of conductive capacitive tab members carried from the adjacent conductor member, whereby the slope of the dispersion curve for the slow wave circuit is increased in the high phase shift per section region.

Another feature of the present invention is the same as any one or more of the preceding features including the provision of extending the adjacent conductive member or members over to the back wall of the vane array for enhancing the thermal capacity of the slow wave circuit and providing improved mechanical strength.

Another feature of the present invention is the provision of a coaxial line matching network for matching into the slow wave circuits of the present invention.

Another feature of the present invention is the provision of a strip line matching network for matching into the slow wave circuits of the present invention.

These and other features and advantages of the present invention will become more apparent upon a perusal of the following specification taken in conjunction with the accompanying drawing wherein.

Figure 5:
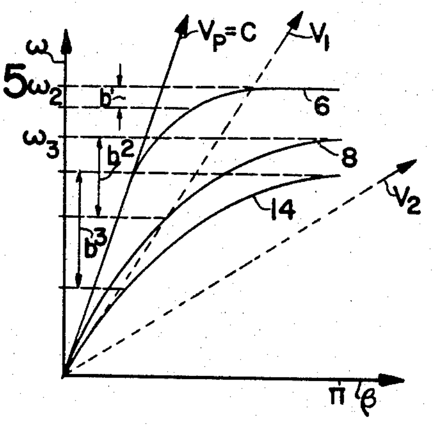
FIG. 5 is a plot of frequency vs. phase shift per section (dispersion curves) for the various slow wave circuits of the present invention as contrasted with the similar dispersion curve for the prior art circuit of FIGS. 1–3.
Figure 6:
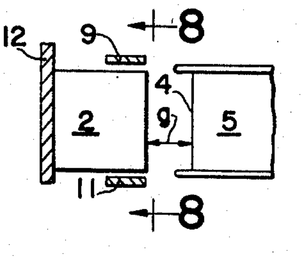
FIGS. 6 and 7 are longitudinal sectional view of alternative slow wave circuits embodying features of the present invention.
Figure 8:
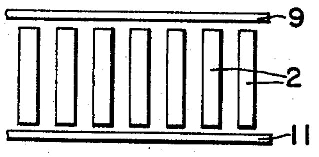
Figure 9:
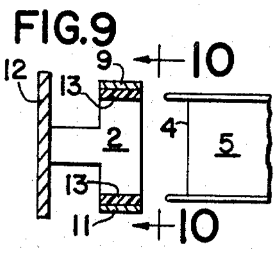
Figure 10:
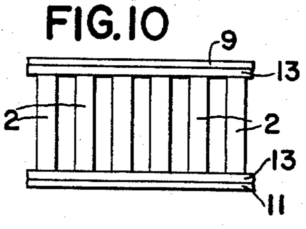
Figure 7:
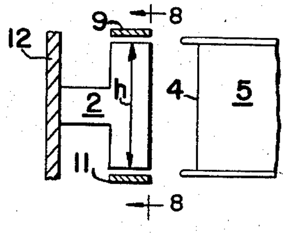
Figure 11:
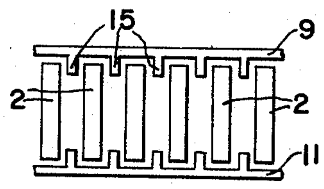
Figure 13:
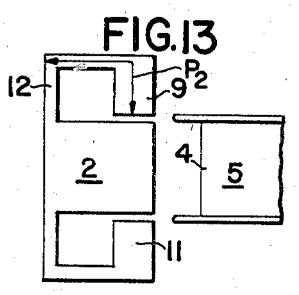
Figure 14:
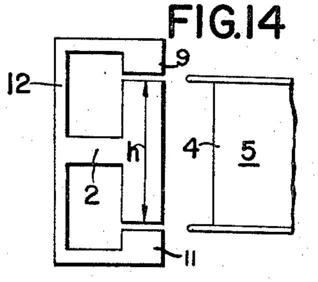
Figure 15:
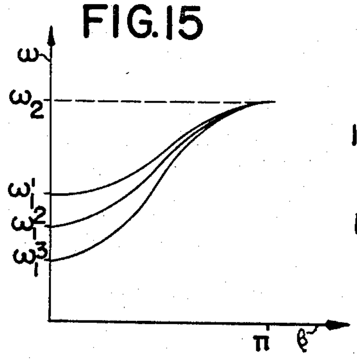
Figure 16:
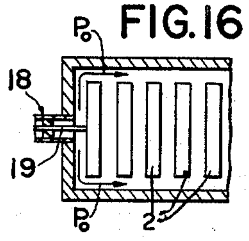
Figure 17:
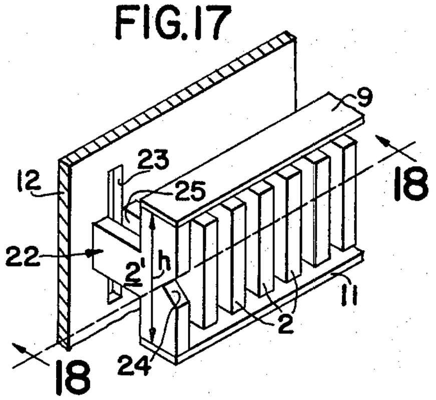
Figure 20:
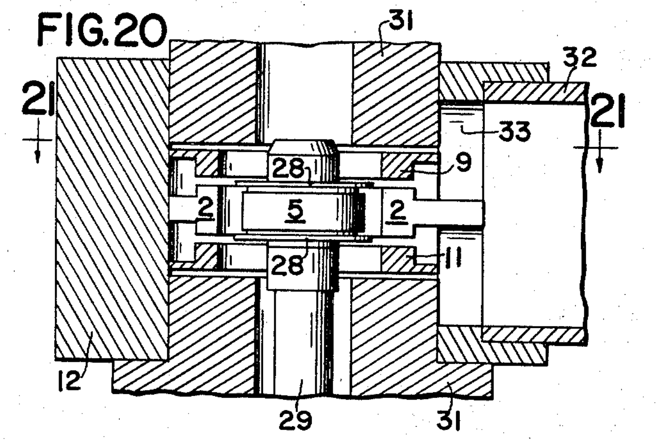
Figure 18:
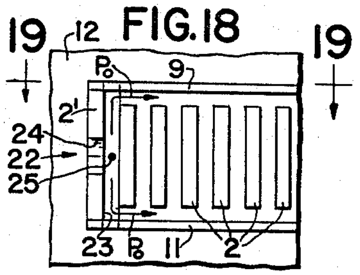
Figure 21:
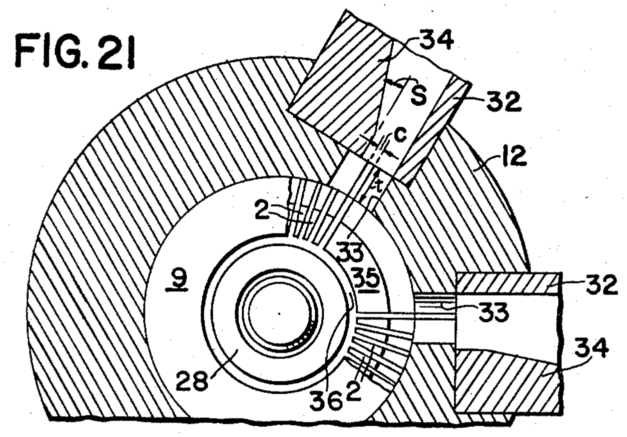
Figure 19:
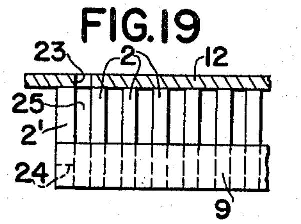

FIG. 8 is a longitudinal sectional view of a linearized version of the circuits of FIGS. 6 and 7 taken along lines 8—8 in the direction of the arrows, FIG. 9 is the same view as FIGS. 6 and 7 showing a dielectrically loaded version of the circuits of FIGS. 6 and 7, FIG. 10 is a linearized version of the circuit of FIG. 9 taken along line 10—10 in the direction of the arrows, FIG. 11 is the same view as FIG. 10 showing an alternative capacitively loaded slow wave circuit to that of FIG. 9, FIGS. 12–14 are alternative longitudinal sectional views of slow wave circuits embodying features of the present invention, FIG. 15 is the same plot as FIG. 5 showing the variation in low frequency dispersion characteristics for the circuits of FIGS. 12–14, FIG. 16 is a similar view to that of FIGS. 8, 10 and 11 showing a coaxial line matching network for matching into a circuit embodying features of the present invention, FIG. 17 is a perspective view of an alternative strip line matching network for matching into the circuits embodying features of the present invention, FIG. 18 is a view of the structure of FIG. 17. taken along line 18—18 in the direction of the arrows, FIG. 19 is a view of the structure of FIG. 18 taken along line 19—19 in the direction of the arrows, FIG. 20 is a longitudinal view partly in section showing a crossed field tube embodying the features of the present invention, and FIG. 21 is a transverse sectional view of the structure of FIG. 20 taken along line 21—21 in the direction of the arrows.

Figure 1:
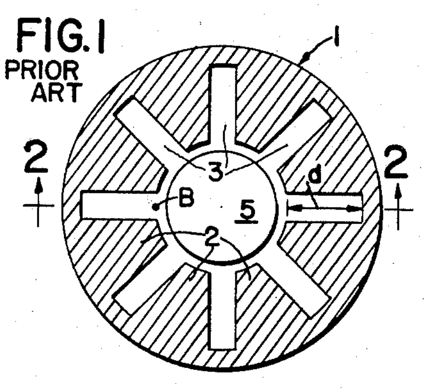
FIG. 1 PRIOR ART
FIG. 1 is a schematic simplified transverse sectional view of a typical prior art unstrapped vane magnetron.
Figure 2:
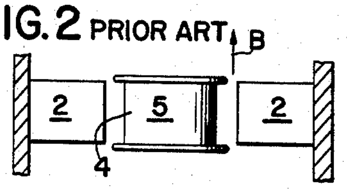
FIG. 2 PRIOR ART
FIG. 2 is a longitudinal sectional view of the structure of FIG. 1 taken along line 2—2 in the direction of the arrows.
Figure 3:
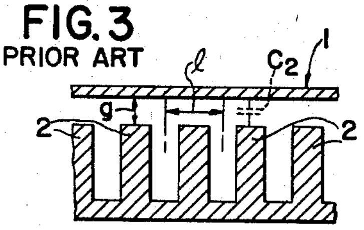
FIG. 3 PRIOR ART
FIG. 3 is a transverse sectional view of a linearized version of a typical prior art unstrapped vane magnetron circuit of FIGS. 1 and 2.

Referring now to FIGS. 1–3 there is shown the prior art vane slow wave circuit. As used herein the term "vane" includes conductive finger portions between adjacent slots or between adjacent slot and hole shaped resonant structures. The vane circuit 1 includes a circular array of vanes 2 defined by the metal fingers between adjacent radial slots 3 in the anode of a typical crossed field tube, only partially shown. The slots 3 have a radial depth, *d*, which is typically a quarter wavelength long and thus form cavity resonators resonant near the upper cutoff frequency $\omega_2$ of the vane circuit. The vanes 2 and slots 3 form a series r.f. impedance loadinng, which is inductive in the first pass band of the circuit below $\omega_2$, in one wire of a two wire transmission line. The other wire of the transmission line is formed by the ground plane surface 4 of a cylindrical cathode emitter 5 coaxially disposed of the circular vane array. A positive potential as of several KV is applied to the anode circuit 1 with respect to the cathode 5 and an axial magnetic field 8 threads through the space between anode 1 and cathode 5. With the potentials applied, electrons emitted from the cathode 5 trend to operate around the cathode 5 and cumulatively interact with series r.f. voltages developed between adjacent vanes 2.

The dispersion curve for the circuit of FIGS. 1–3 is shown as curve 6 of FIG. 5. From the dispersion curve 6 it is seen that the prior vane circuit has little bandwidth in the fundamental first pass band, in the high phase shift per section region. It was for that reason that the prior vane circuit was not used as a practical wide band amplifier circuit but was most often used as an oscillator in the $\pi$ mode of operation.

Figure 4:
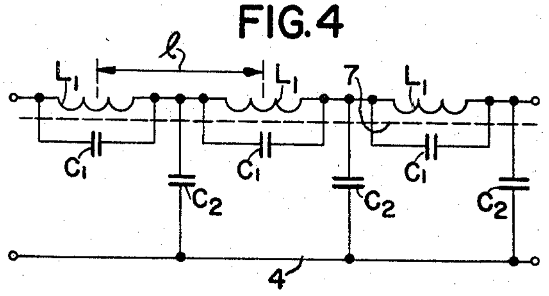
FIG. 4 is a lumped element equivalent circuit for the vane magnetron circuit of FIGS. 1–3 also depicting the sequential series electron interaction.

The vane circuit 1 of FIGS. 1–3 has an equivalent lumped circuit as shown in FIG. 4, where $L_1$ and $C_1$ are the inductance and capacitance, respectively, of the slots 3 and $C_2$ is the capacity between the tips of the vanes and the cathode ground plane 4. The electron stream follows a path 7 as indicated in FIG. 4 such as to sequentially interact with the series voltages developed across adjacent vanes 2.

From the equivalent circuit of FIG. 4 it is seen that the dispersion curve 6 could be modified for increased bandwidth by increasing the shunt capacitance $C_2$ thus lowering the high frequency cutoff to $\omega_3$ and increasing the slope of the dispersion curve in the high phase shift per section region as indicated by curve 8 of FIG. 5. This modification of the dispersion curve increases its electronic bandwidth $b^2$. However, with the circuit of FIGS. 1–3 $C_2$ is increased only by decreasing the gap spacing, *g*, between the anode vane tips and the cathode. Reducing this gap spacing, *g*, results in a gap, *g*, which is substantially less than the gap required for satisfactory electronic interaction with the rotating stream of electrons and thus the dilemma of the prior art.

Referring now to FIGS. 6 and 8 there is shown an embodiment of the present invention wherein a pair of metallic ring shaped ground plane members 9 and 11 as of copper are disposed closely adjacent the side edges of the vanes 2, as of copper, to effectively, from an r.f. circuit standpoint, replace the cathode ground plane 4. This will be the result when the capacitance between the vanes 2 and the ground plane members 9 and 11 substantially exceeds the capacitance between the vanes 2 and the cathode ground plane 4. The equivalent circuit for this slow wave vane circuit remains the same as FIG. 4. However, now, the shunt capacity $C_2$ will be greater than for the prior art circuit of FIGS. 1–3 without interfering with the optimum gap spacing, *g*, for electronic interaction. Thus curve 8 represents the improved dispersion characteristic for the improved vane circuit of FIGS. 6 and 8. Although in a preferred embodiment two ground plane members 9 and 11 are employed for symmetry, one ground plane member would suffice for narrow band operation.

Referring now to FIG. 7 there is shown an alternative embodiment to the improved slow wave circuit of FIGS. 6 and 8. In this embodiment, the vanes 2 have been increased in height, *h*, as compared to the prior art of FIG. 2 and the structure of FIGS. 6 and 8 and cut away along their top and bottom edges near the back wall 12. Increasing the height, *h*, of the vanes 2 provides increased volume of r.f. electric field for interaction with the electron stream and the vanes 2 thus formed have a T-shape with the side arms of the T vanes closely spaced to the conductors 9 and 11 and the base leg portion connecting to the back wall 12.

Referring now to FIGS. 9 and 10 there is shown an alternative embodiment to the vane circuit of FIG. 7 wherein annular slabs 13 of dielectric material such as alumina ceramic are disposed in the space between the ring like ground plane members 9 and 11 and the side edges of the vanes 2. The dielectric slabs 13 further increase the shunt capacitance $C_2$ of the slow wave circuit and further improve the dispersion curve as shown by curve 14 of FIG. 5 thereby yielding still greater electronic bandwidth $b^3$. For prolonged periods of operation, especially with thermionic cathode emitters 5 it may be found that the dielectric slab members 13 tend to be coated on their surfaces facing the cathode 5 with a conductive film. This film when it becomes sufficiently thick could deleteriously effect the transmission characteristics of the vane slow wave circuit.

Referring now to FIG. 11 there is shown an alternative vane slow wave circuit to that of FIG. 9 wherein the capacitive loading of the slabs 13 is replaced by an array of conductive capacitive tab members 15 which are interdigitated with the side edges of the vanes 2 for increasing the shunt capacitance $C_2$ between the rings 9 and 11 and the vanes 2. The circuit of FIG. 11 will have the same dispersion curve 14 as that of the circuit of FIG. 9.

Figure 12:
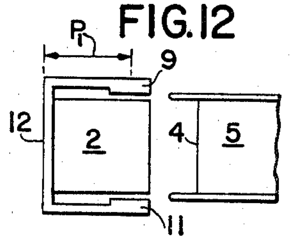

Referring now to FIGS. 12–14 there is shown an alternative embodiment of the present invention. In this embodiment the ring shaped ground plane members 9 and 11 are extended over to the back wall 12 of the vane array. When this is done the thermal capacity and mechanical ruggedness of the slow wave circuit is enhanced. However, a low frequency cut off, $\omega_1'$, (see FIG. 15) is introduced caused by the addition of shunt inductive loading. For close spacing between the inductive portions of the slots 3 and the ground plane 9 the low frequency cut off $\omega_1'$ will not be much different from the high frequency cut off $\omega_2$ and therefore the circuit will have very little electronic bandwidth. Additional wave delay may also be introduced by radially slotting the rings 9 and 11 and their support arms over to the back wall 12. For this case the desired shaping of the dispersion curve due to increased shunt capacitive loading from the ring members 9 and 11 is largely lost due to the resonance effect resulting from extending the ring members 9 and 11 over to the back wall 12.

This undesired resonance effect is overcome by increasing the path length, $P_2$, (compared to the $P_1$ spacing of FIG. 12) from the capacitive region of the rings 9 and 11 over to the back wall 12 as shown in FIG. 13. This increase in $P_2$ pushes the low frequency cut off to a lower frequency, $\omega_1^2$, as shown in FIG. 15.

An alternative embodiment to the structure of FIG. 13 is shown in FIG. 14. In FIG. 14 the vanes 2 are notched out from the side edges near the back wall 12 to increase their inductance, as previously described with regard to FIG. 7. Also, as in FIG. 7, the vane height, *h*, at the free ends of the vanes 2 is increased as compared to the prior art of FIG. 2 and the structure of FIGS. 6 and 8 to provide a larger electronic interaction region. Notching out the vanes 2 further lowers the low frequency cut off, $\omega_1^3$, thereby further increasing the electronic bandwidth.

Referring now to FIG. 16 there is shown a coaxial line matching network for coupling R.F. energy into or out of the slow wave circuit of the present invention. In FIG. 16 is coaxial line 18 has its inner conductor 19 connected to one of the vanes at a point midway in the height, *h*, of the vane 2, i.e., at *h*/2. Preferably the connecting point is also out near the free end of the vane in the region where the vane is capacitively coupled to the annular members 9 and 11. In this manner power flow, indicated by $P_0$, to or from the slow wave circuit is equally divided between the circuit portions including the upper and lower ring members 9 and 11.

Referring now to FIGS. 17–19 there is shown an alternative strip line matching network for coupling R.F. power to or from the slow wave circuit of the present invention. In this strip line matching network 22, an axially directed slot 23 is provided in the back wall 12 of the circuit which slot 23 is in wave energy communication with a conventional rectangular waveguide, not shown, external of the wall 12. The slot 23 is positioned between a pair of adjacent vane members 2 and 2′. One of the vane members 2′ has a tip portion with increased height, *h*, to extend between and to make electrical contact with both ring members 9 and 11, respectively. Midway of its height, *h*/2, the end vane 2′ is provided with a V-shaped notch 24 extending into the vane 2′ from the free end thereof to form an H-plane power divider for equally splitting the R.F. power flow, $P_0$, and causing half of the power to flow over each of the circuit portions defined by each ring members 9 and 11 and its opposed vane array portion. Although the V-shaped notch 24 is preferred for improved matching it is not essential for all cases. Thus, the R.F. power flows between the waveguide, not shown, and the vane circuit of the present invention takes place via the intermediary of the coupling slot 23 and narrow strip line portion 25 defined by the space between adjacent vanes 2 and 2′ and the H-plane power divider of the vane 2′.

Referring now to FIGS. 20 and 21 there is shown a crossed field forward wave amplifier tube incorporating the improved vane slow wave circuit of the present invention.

More specifically a typical C-band crossed field amplifier tube structure is shown. The tube includes a hollow cylindrical vacuum envelope wall member 12 as of copper. An array of vanes 2 project radially inwardly from the inner side of the wall 12 to form with a pair of axially spaced annular conductors 9 and 11 a vane type slow wave circuit as shown and previously described with respect to FIG. 14. Conductors 9 and 11, as of copper, extend over to and are conductively joined, as by brazing, to the wall 12.

A hollow cylindrical cold cathode emitter 5 is coaxially disposed centrally of the vane array circuit. The cathode is made of a material having a high secondary electron emission ratio such as beryllium copper. A pair of annular end hats 28 are disposed at the axial ends of the emitter 5. Conventional high voltage feed through insulator assemblies, not shown, bring the cathode stem 29 through the vacuum envelope to the emitter.

A pair of hollow cylindrical magnetic pole pieces 31 as of soft iron are axially spaced apart on opposite sides of the emitter 5 and vane circuit to provide an axial magnetic field B throughout the electronic interaction gap, *g*, between emitter 5 and the vane circuit. Permanent C-shaped magnets, not shown, join to the pole pieces 31, externally of the tubes vacuum envelope, to provide the magnetromotive force for the axial magnetic field B.

A pair of waveguides 32 project radially away from the main body wall member 12. Suitable gas-tight wave permeable window members, not shown, seal off the outer extremities of the waveguides 32 and include flange assemblies to permit the tube to be connected to waveguides for applying to and or extracting wave energy from the tube. Dumbell irises 33 extend substantially entirely across the waveguide 32 and communicate with slots 3 through wall 12. Irises 33 are matched to the waveguides 33 via capacitive matching ramps 34, which have a slope, S, of approximately 12.5°. The irises 33 are relatively thick, i.e., they have a length, *t*, which is more than a small fraction of their minimum transverse dimensions, *c*, in order to provide broadband low Q coupling since the Q of the iris 33 is inversely proportional to its thickness to transverse ratio, *t*/*c*.

The vane circuit is severed at 35 by a metallic sector subtending approximately 54° of arc to provide a drift space 36 such that the re-entrant beam can debunch before re-entering into interaction with the vane circuit. In a typical tube example of the structure of FIGS. 20 and 21, the tube had an operating range of 3% as a forward wave amplifier, an average power output of 100 watts at C band, cathode to anode voltage of 2500 to 3000 V., a synchronous voltage of 250 V., and a gain of 15 db. The circuit vanes 2 had a height, *h*, of 0.060″, a total length *a*, of 0.500″ and a total of 50 vanes in the circuit. The circuit ring members 9 and 11 had a spacing to the circuit vanes of 0.010″ and the rings had a radial width of between 0.150 and 0.200″ in the region of their most intense capacity where they overlaid the vane circuit.

Since many changes can be made in the above construction and many apparently widely different embodiments could be made without departing from the scope thereof, it is intended that all matter contained in the above description or shown in the accompanying drawings shall be interpreted as illustrative and not in a limiting sense.

What is claimed is:

1. In a microwave amplifier tube apparatus, means forming a conductive wall structure having an array of conductive vanes projecting therefrom to define an array of vane resonators, said array of vane resonators each having approximately the same resonant frequency and said vanes being free of conductive straps interconnecting sets of said vanes, said vanes having root portions affixed to said conductive wall and free side and front edge portions, said free side edge portions of said vanes near said front edges of said vanes terminating in a pair of parallel planes on opposite sides of said array of vanes, means forming a conductive member portion overlying said free side edge portions of said vanes in nonelectrical contact therewith at the overlying region for loading said vanes to form a slow wave circuit with said vane array, means for applying a signal wave to be amplified to said slow wave circuit, means for producing a stream of electrons adjacent the front edge portion of said vane array for cumulative electronic interaction between the wave on said slow wave circuit and the electrons of the stream, means for extracting amplified signal wave energy from said slow wave circuit, means forming a cathode structure adjacent said free front edge portions of said vane array with the spacing between said cathode structure and said vane array being greater than the spacing between said overlying loading memeber and said side edge portion of said vane array, whereby the shape of the dispersion characteristic of said slow wave circuit is more determined by said side edge loading structure than said cathode to vane spacing, the improvement wherein, said overlying side edge loading structure which defines the slow wave circuit with said vanes is more closely spaced to said side edge terminating plane over a portion of the vanes nearer to the front edges thereof than near the root portions thereof, whereby said loading structure provides a predominant capacitive loading for the slow wave circuit.

2. The apparatus according to claim 1 wherein said overlying conductor portion means includes a pair of conductor portions overlying opposite free side edge portions of said vane array.

3. The apparatus according to claim 2 wherein said means for extracting wave energy from the slow wave circuit includes a coaxial line having its center conductor conductively connected to an end vane of said array at a point on said vane which is substantially midway in the height of said vane.

4. The apparatus according to claim 2 wherein said wave extracting means includes an end vane member conductively interconnecting said pair of overlying conductive members, said end vane member having a notch extending into said end vane substantially midway of its height from the front edge thereof to form an H-plane power divider.

5. The apparatus according to claim 1 wherein said vanes are "T" shaped with the side arm edges of said vanes being more closely spaced to said overlying conductor member portion than the base leg portion of said T-shaped vanes.

6. The apparatus according to claim 1 including a dielectric loading member disposed between said overlying conductor member portion and the side edge portions of said vanes for increasing the shunt loading of said slow wave circuit.

7. The apparatus according to claim 1 including an array of conductive capacitive loading tabs extending from said overlying conductor member into the space between adjacent vanes of the vane array for increasing the shunt capacitive loading of the slow wave circuit.

References Cited

UNITED STATES PATENTS

| | | | |
|---|---|---|---|
| 2,637,004 | 4/1953 | Malter | 315—39.75 X |
| 2,849,652 | 8/1958 | Steimel | 315—39.53 X |
| 2,949,563 | 8/1960 | Willshaw | 315—39.73 X |
| 8,965,797 | 12/1960 | Yu et al | 315—39.67 X |
| 2,976,455 | 3/1961 | Birdsall et al | 333—31 X |
| 3,121,820 | 2/1964 | Wilbur | 315—39.75 X |

HERMAN KARL SAALBACH, *Primary Examiner.*

PAUL L. GENSLER, *Assistant Examiner.*